March 18, 1952 W. L. VINSON 2,589,753
KITCHEN POT OR PAN SCRAPER
Filed Sept. 30, 1946
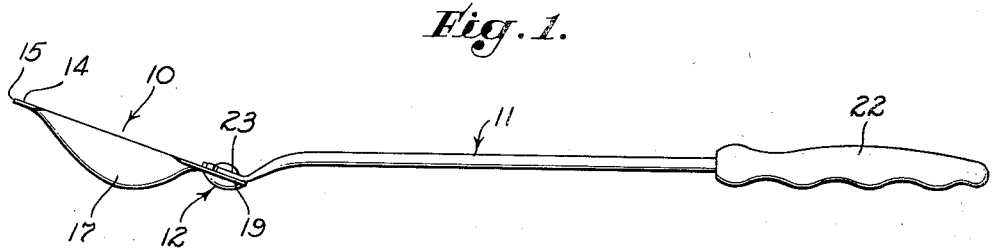
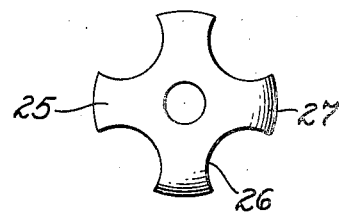
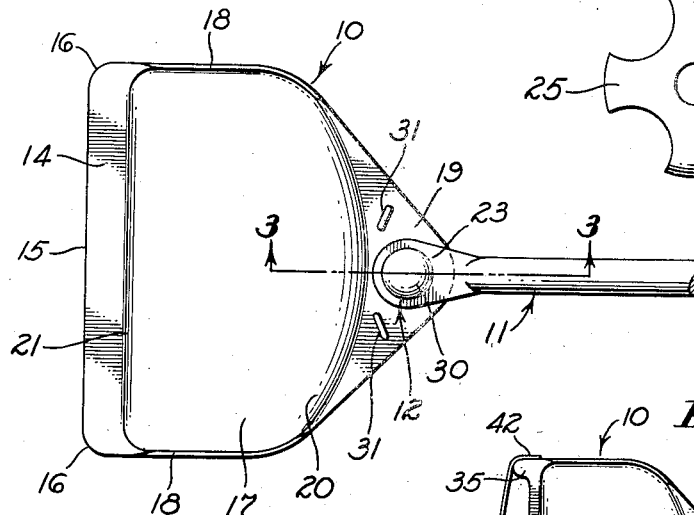
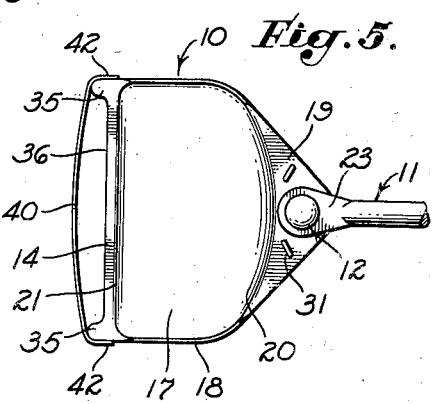
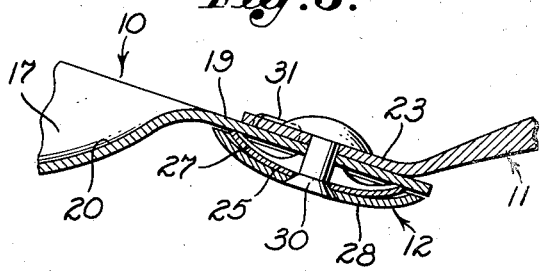
INVENTOR.
WALTER L. VINSON
BY HIS ATTORNEYS.
HARRIS, KIECH, FOSTER & HARRIS
BY Patented Mar. 18, 1952

2,589,753

UNITED STATES PATENT OFFICE 2,589,753

KITCHEN POT OR PAN SCRAPER

Walter L. Vinson, Sherman Oaks, Calif.

Application September 30, 1946, Serial No. 700,220

5 Claims. (Cl. 30—136)

This invention relates to kitchen utensils and, more particularly, to devices for stirring and scraping food or other contents of pots, pans and other vessels.

It is an object of my invention to provide an improved and efficient means for stirring and scraping the contents of a vessel adhering to the sides and bottom thereof.

It is another object of my invention to provide a device having an extensive scraping edge that will conform to or remain in contact with the wall surfaces of a pan or other vessel irrespective of changes in angular position of a handle of the device.

It is a further object of my invention to provide a durable, attractive device for stirring and scraping which is composed of a minimum number of parts adapted to economical manufacture.

Further objects of my invention, and advantages thereof, will be apparent from the following specification and the drawing which is for the purpose of illustration only.

In the drawing:

Fig. 1 is a side elevation of the combined stirring and scraping device;

Fig. 2 is a fragmentary plan view of the device;

Fig. 3 is a fragmentary longitudinal sectional view taken along line 3—3 of Fig. 2;

Fig. 4 is a plan view of the spring friction washer; and

Fig. 5 is a fragmentary plan view of an alternative embodiment of the device.

Referring particularly to Fig. 1, which shows one embodiment of the invention, the combined stirring and scraping device has, in general, a thin blade member 10 pivoted to a handle member 11 by a friction-type pivot means 12.

In the embodiment of the invention shown in Figs. 1 and 2, the blade member 10 is formed from any suitable sheet metal, typically stainless steel, and provides a transversely disposed blade 14 terminating in a thin, transversely disposed scraping edge 15 at its forward end. This scraping edge 15 can be beveled or sharpened, if desired, but in the usual practice is merely a square cut or slightly rounded edge of the thin sheet metal of which the blade member 10 is formed. Rounded corners 16 are provided at the junction of the scraping edge 15 and the sides of the blade member.

The function of this scraping edge is to remove adhering material from the bottom interior surface of a pan or other vessel when moved along this surface. It is an important feature of the invention that this scraping edge is relatively extensive and is shaped to conform to and move in line contact with the surface to be scraped whereby the adhering material is cleanly removed in an extensive area each time the blade member sweeps along the surface to be scraped.

In the preferred embodiment, the blade member 10 is made spoon-like by being deformed or shaped to form a central dished depression 17 surrounded by a lip or ledge 18. The forward portion of this ledge 18 comprises the blade 14 and the rear portion comprises a flat extension 19, these portions preferably lying in the same plane. The dished depression 17 provides a rear oval portion 20 joining the flat extension 19, but its forward portion preferably slopes shovel-like toward the blade 14 to provide a rounded crest 21 lying parallel to the scraping edge 15. The shovel-like forward portion of the depression 17 facilitates the receiving of material removed by the scraping edge 15 if the blade member 10 is advanced with its top plane at an acute angle with the bottom of the pan or other vessel being scraped. The dished depression 17 also makes the invention usable as a spoon or ladle, permitting dipping liquid from the pan or vessel for inspection or transfer to another container.

The handle member 11 carries a handle 22 at its rear end and provides, at its forward end, a flattened front portion 23 pivoted to the blade member 10 by the pivot means 12. The flattened portion 23 is preferably disposed at a slight angle to the main axis of the handle member 11. The blade member 10 is preferably pivoted to swing about an axis perpendicular thereto and in a plane intersected by the main axis of the handle member 11, the preferred angular relationship being illustrated in Fig. 1.

The pivot means 12 is preferably of the friction-type and provides means for relatively freely pivoting the blade member to the handle member 11 while providing a slight yielding restraint sufficient to prevent the weight of the blade member 10 from swinging it about the pivot means when the pivot axis is horizontal. The preferred pivot means is best shown in Figs. 3 and 4 and includes a cupped shape friction washer 25. This friction washer 25 provides a discontinuous edge portion adapted to engage the flat extension 19 and preferably formed by cutting notches 26 in the washer 25 to leave resilient tabs 27 which yieldably engage the flat extension 19. To minimize entrance of foreign material into the space within the cupped friction washer 25, I prefer to use a complementary covering member 28 of greater diameter than the friction washer 25 and cupped somewhat less than this friction washer. A suitable pivot pin, shown as a rivet 30, extends through aligned openings of the flattened portion 23 of the handle member, the flat extension 19 of the blade member 10, the friction washer 25 and the covering member 28. This rivet determines the pivot axis and is initially tightened to deform slightly the resilient tabs 27, thus giving a yielding, friction-type connection between the handle member 11 and the blade member 10.

It is usually preferable to provide a stop means limiting the maximum pivoting action. In the preferred embodiment this stop means includes two stop members 31 extruded upwardly from the blade member and adapted to be engaged by the flattened portion 23 of the handle member 11. In the preferred arrangement the maximum pivoting is preferably equal to or less than one-fourth revolution in either a clockwise or counterclockwise direction from the aligned position shown in Fig. 2. When the spoon-like blade member 10 is swung sidewise, e. g., against one of the stop members 31, the invention becomes an excellent side-type ladling device, the spoon-like blade member 10 being to one side of the axis of the handle member 11.

The type of pivot means 12 previously described is particularly desirable when stirring with the blade 14 in an upright position. As the handle member 11 is moved to and fro or in a circular orbit, it requires only a slight downward pressure on the handle member to maintain the scraping edge 15 in line contact with the bottom of the pan or other vessel, the pivot means permitting the angular relationship between the handle member 11 and the blade member 10 to change during the scraping operation. All portions of the bottom of the pan or other vessel can thus be scraped uniformly and thoroughly with only a few strokes. The rapidity and thoroughness of the scraping prevents burning of the contents of the pan or vessel if disposed on a stove. The rounded corners 16 permit scraping close to the edge of the pan or vessel.

Fig. 5 shows another embodiment of the invention particularly adapted to the scraping of pans or vessels in which the bottom interior surface is slightly rounded or irregular. Here the blade 14 is cut away in its central portion to provide end lugs 35 separated by a recessed portion 36. Extending across the recessed portion 36 between the lugs 35 is a resilient blade 40 which may be a piece of spring wire or any thin member. The member 40 is preferably bowed outwardly, as suggested in Fig. 5, to have an initial curvature corresponding to the minimum radius curved surface of the pan or other vessel to be scraped. The ends of the resilient member 40 may be bent to lie along the sides of the blade member 10 and to provide end portions spot welded or otherwise secured to these sides at a position indicated by the numeral 42. Such a construction permits the resilient member 40 to straighten when scraping a plain surface or to conform to the contour of an irregular surface when slight pressure is applied to move the blade member 10 toward the surface being scraped.

Various changes and modifications can be made without departing from the spirit of the invention as defined in the appended claims.

I claim as my invention:

1. In a stirring and scraping device the combination of: a blade member providing transversely spaced, forwardly extending members and a thin resilient member extending between said forwardly extending members to provide a scraping edge; a handle member providing a forward portion; and means for pivoting said forward portion of said handle member to said blade member at a position rearwardly of said resilient member.

2. A stirring and scraping device as defined in claim 1, in which said resilient member is bowed forwardly and is sufficiently flexible to conform to a flat surface when pressed thereagainst.

3. In a kitchen utensil, the combination of: a generally spoon-like blade member having spaced forward and rearward ends and having at its forward end a relatively long scraping edge adapted to make line contact with a surface to be scraped; a handle member; pivot means connecting said blade member to said handle member adjacent the rearward end of said blade member for relative rotational movement of said members about an axis substantially perpendicular to said blade member; resilient means retained by said pivot means and engaging one of said members for pressing said one member into frictional engagement with the other of said members; and stop means carried by one of said members and engageable by the other of said members for limiting relative rotational movement of said members.

4. In a device of the character described, the combination of: a blade member having spaced forward and rearward ends and having at its forward end an elongated, transversely extending scraping edge, said blade member having a dished central portion intermediate its forward and rearward ends; a handle member; pivot means connecting said blade member to said handle member for relative rotational movement of said members; resilient means for pressing said members together into frictional engagement with each other to prevent free relative rotational movement of said members; and stop means carried by one of said members and engageable by the other of said members for limiting relative rotational movement of said members, said resilient means including a dished spring washer which is seated against one of said members, said pivot means including a pivot pin extending through said members and said washer to hold said washer in engagement with said one member, said device including in addition a dished cover for said spring washer, said pivot pin also extending through said cover.

5. In a device of the character described, the combination of: a generally spoon-like blade member having forward and rearward ends and having an elongated scraping edge at its forward end, said blade member having a dished central portion intermediate its forward and rearward ends and having a ledge which surrounds said dished central portion; a handle member; means pivotally connecting said handle member to said ledge adjacent the rearward end of said blade member; resilient means for pressing said blade members together into frictional engagement with each other and a pair of stops on said ledge adjacent the rearward end of said blade member and respectively disposed on opposite sides of said handle member to limit relative pivotal movement of said members.

WALTER L. VINSON.

REFERENCES CITED

The following references are of record in the file of this patent:

UNITED STATES PATENTS

| Number | Name | Date |
|---|---|---|
| 1,226,173 | Benjamin | May 15, 1917 |
| 1,477,653 | La Barre | Dec. 18, 1923 |
| 1,545,542 | Albrecht et al. | July 14, 1925 |
| 2,007,012 | Troendly | July 2, 1935 |

FOREIGN PATENTS

| Number | Country | Date |
|---|---|---|
| 397,879 | France | 1909 |